(12) United States Patent
Farris et al.

(10) Patent No.: US 7,012,898 B1
(45) Date of Patent: *Mar. 14, 2006

(54) TELEPHONY COMMUNICATION VIA VARIED REDUNDANT NETWORKS

(75) Inventors: Robert D. Farris, Sterling, VA (US); Dale L. Bartholomew, Vienna, VA (US)

(73) Assignee: Verizon Services Corp., Arlington, VA (US)

(*) Notice: Subject to any disclaimer, the term of this patent is extended or adjusted under 35 U.S.C. 154(b) by 656 days.

This patent is subject to a terminal disclaimer.

(21) Appl. No.: 09/617,816

(22) Filed: Jul. 17, 2000

Related U.S. Application Data

(63) Continuation of application No. 08/931,985, filed on Sep. 17, 1997, which is a continuation-in-part of application No. 08/634,543, filed on Apr. 18, 1996, now Pat. No. 6,154,445, and a continuation-in-part of application No. 08/698,713, filed on Aug. 16, 1996, now Pat. No. 6,125,113, and a continuation-in-part of application No. 08/790,888, filed on Feb. 3, 1997, now Pat. No. 6,122,255.

(51) Int. Cl.
  *H04J 1/16* (2006.01)
(52) U.S. Cl. .................. 370/252; 370/353; 370/400
(58) Field of Classification Search ........ 370/352–356, 370/400, 401, 252, 229–238, 349, 278, 389, 370/392, 253; 379/88.17; 709/227; 340/825.05
See application file for complete search history.

(56) References Cited

U.S. PATENT DOCUMENTS

| | | | |
|---|---|---|---|
| 5,608,786 A | 3/1997 | Gordon | |
| 5,680,442 A * | 10/1997 | Bartholomew et al. | .. 379/88.26 |
| 5,724,355 A | 3/1998 | Bruno et al. | |
| 5,726,984 A | 3/1998 | Kubler et al. | |
| 5,732,078 A * | 3/1998 | Arango | ....................... 370/355 |
| 5,898,668 A | 4/1999 | Shaffer | |
| 5,898,673 A | 4/1999 | Riggan et al. | |
| 5,901,140 A | 5/1999 | Van As et al. | |
| 5,910,946 A | 6/1999 | Csapo | |
| 5,946,299 A | 8/1999 | Blonder | |
| 5,959,998 A | 9/1999 | Takahashi et al. | |
| 6,064,653 A * | 5/2000 | Farris | .......................... 370/237 |
| 6,154,445 A * | 11/2000 | Farris et al. | ................. 370/237 |
| 6,449,259 B1 * | 9/2002 | Allain et al. | ................. 370/253 |

OTHER PUBLICATIONS

Keiser et al., "Digital Telephony and Network Integration", 1995, Chapman Hall, Second Edition, pp. 426-428.*

* cited by examiner

*Primary Examiner*—John Pezzlo
(74) *Attorney, Agent, or Firm*—Leonard C. Suchtya, Esq.; Joseph R. Palmieri, Esq.; Rader, Fishman & Grauer PLLC

(57) ABSTRACT

A switched telephone network is arranged in a manner to enable packet voice communication between telephone terminals via multiple redundant packet switched networks. The packet switched networks may utilize different protocols, be operated by different entities, and have primary functions other than voice communication. One example of such a network may be internetworked networks, such as the Internet. One example of an alternate packet switched network may be a network whose primary function is control of a circuit switched telephone network. The common channel interoffice switching system (CCIS) of a public switched telephone network (PSTN) is one such example.

44 Claims, 4 Drawing Sheets

TELEPHONY COMMUNICATION VIA VARIED REDUNDANT NETWORKS

This application is a continuation of application Ser. No. 08/931,985 filed Sep. 17, 1997 which is a continuation-in-part of U.S. patent application Ser. No. 08/634,543, filed Apr. 18, 1996, now U.S. Pat. No. 6,154,445 issued Nov. 28, 2000; Ser. No. 08/698,713, filed Aug. 16, 1996, now U.S. Pat. No. 6,125,113; and Ser. No. 08/790,888, filed Feb. 3, 1997, now U.S. Pat. No. 6,122,255.

RELATED APPLICATIONS

This application is a continuation-in-part of U.S. patent application Ser. No. 08/634,543, filed Apr. 18, 1996, Ser. No. 08/698,713, filed Aug. 16, 1996, and Ser. No. 08/790,888, filed Feb. 3, 1997.

This application is also related to application Ser. No. 08/598,767, Analog Terminal Internet Access, filed Feb. 2, 1996, which is a continuation-in-part of application Ser. No. 08/353,281, filed Dec. 5, 1994; Ser. No. 08/371,906, filed Jan. 12, 1995; Ser. No. 08/539,952, filed Oct. 6, 1995; Ser. No. 08/557,749, filed Dec. 13, 1995; Ser. No. 08/634,544, filed Apr. 18, 1996; Ser. No. 08/790,888, filed Feb. 3, 1997; Ser. No. 08/815,363, filed Mar. 11, 1997; Ser. No. 08/816,227, filed Mar. 12, 1997; Ser. No. 08/821,027, filed Mar. 19, 1997; and Ser. No. 08/547,178, filed Oct. 24, 1995, which applications are assigned to the assignee of the instant application. The specifications of those applications are incorporated herein by reference in their entirety.

TECHNICAL FIELD

The present invention relates to methods and system structures for providing public and private telephone service between two terminals over selectable networks of differing types. More particularly the invention relates to providing such telephone service in a manner to permit optimization of a selectable parameter, such as, minimizing cost, maximizing quality, maximizing availability of connection, and the like.

BACKGROUND

The availability of public and private telephony communication has become so universal in the United States and in other developed countries that it has become critical to the functioning of modern society. At the same time, its very popularity and multipurpose use have led to demands that tax the efficient operation of the varied systems that provide that universality. While multiple types of networks are used for providing telephone service it is not always appreciated to what a large extent those different networks are interrelated. Thus, the very efficacy of one of the interrelated systems in optimizing one parameter may cause the overload or breakdown of an interrelated system, which is necessary to provide end to end service. In order that the nature of these problems may be fully appreciated, it is necessary to have an understanding not only of the factors which determine the inherent parameters of the individual networks, but also the factors which impose limitations on the interlinked networks. To that end there is here presented a brief description of the two networks which are most currently involved. These are the Internet and the public switched telephone network (PSTN).

The Internet is an interconnected global computer network of tens of thousands of packet-switched networks using the Internet protocol (IP). It is a network of networks. For purposes of understanding how the Internet works, three basic types of entities can be identified. These are end users, Internet service providers, and backbone providers. End users access and send information either through individual connections or through organizations such as universities and businesses. End users in this context include both those who use the Internet primarily to receive information, and content creators who use the Internet to distribute information to other end users. Internet service providers (ISPs), such as Netcom, PSI, and America Online, connect those end users to Internet backbone networks. Backbone providers, such as MCI, UUNet, and Sprint, route traffic between ISPs, and interconnect with other backbone providers.

This tripartite division highlights the different functionalities involved in providing Internet connectivity. The actual architecture of the Internet is far more complex. Backbone providers typically also serve as ISPs; for example, MCI offers dial-up and dedicated Internet access to end users, but also connects other ISPs to its nationwide backbone. End users such as large businesses may connect directly to backbone networks, or to access points where backbone networks exchange traffic. ISPs and backbone providers typically have multiple points of interconnection, and the inter-relationships between these providers are changing over time. It is important to appreciate that the Internet has no "center," and that individual transmissions may be routed through multiple different providers based on a number of factors.

End users may access the Internet though several different types of connections, and unlike the voice network, divisions between "local service" providers and "long-distance" providers are not always clear. Most residential and small business users have dial-up connections, which use analog modems to send data over plain old telephone service (POTS) lines of local exchange carriers (LECS) to ISPs. Larger users often have dedicated connections using high-speed ISDN, frame relay or T1 lines, between a local area network at the customer's premises and the Internet. Although the vast majority of Internet access today originates over telephone lines, other types of communications companies, such as cable companies, terrestrial wireless, and satellite providers, are also beginning to enter the Internet access market.

The roots of the current Internet can be traced to ARPANET, a network developed in the late 1960s with funding from the Advanced Research Projects Administration (ARPA) of the United States Department of Defense. ARPANET linked together computers at major universities and defense contractors, allowing researchers at those institutions to exchange data. As ARPANET grew during the 1970s and early 1980s, several similar networks were established, primarily between universities. The TCP/IP protocol was adopted as a standard to allow these networks, comprised of many different types of computers, to interconnect.

In the mid-1980s, the National Science Foundation (NSF) funded the establishment of NSFNET, a TCP/IP network that initially connected six NSF-funded national supercomputing centers at a data rate of 56 kilobits per second (kbps). NSF subsequently awarded a contract to a partnership of Merit (one of the existing research networks), IBM, MCI, and the State of Michigan to upgrade NSFNET to T1 speed (1.544 megabits per second (Mbps)), and to interconnect several additional research networks. The new NSFNET "backbone," completed in 1988, initially connected thirteen regional networks. Individual sites such as universities could connect to one of these regional networks, which then connected to NSFNET, so that the entire network was linked together in a hierarchical structure. Connections to the federally-subsidized NSFNET were generally free for the regional networks, but the regional networks generally charged smaller networks a flat monthly fee for their connections.

The military portion of ARPANET was integrated into the Defense Data Network in the early 1980s, and the civilian ARPANET was taken out of service in 1990, but by that time NSFNET had supplanted ARPANET as a national backbone for an "Internet" of worldwide interconnected networks. In the late 1980s and early 1990s, NSFNET usage grew dramatically, jumping from 85 million packets in January 1988 to 37 billion packets in September 1993. The capacity of the NSFNET backbone was upgraded to handle this additional demand, eventually reaching T3 (45 Mbps) speed.

In 1992, the NSF announced its intention to phase out federal support for the Internet backbone, and encouraged commercial entities to set up private backbones. Alternative backbones had already begun to develop because NSFNET's "acceptable use" policy, rooted in its academic and military background, ostensibly did not allow for the transport of commercial data. In the 1990s, the Internet has expanded decisively beyond universities and scientific sites to include businesses and individual users connecting through commercial ISPs and consumer online services.

Federal support for the NSFNET backbone ended on Apr. 30, 1995. The NSF has, however, continued to provide funding to facilitate the transition of the Internet to a privately-operated network. The NSF supported the development of three priority Network Access Points (NAPs), in Northern California, Chicago, and New York, at which backbone providers could exchange traffic with each other, as well as a "routing arbiter" to facilitate traffic routing at these NAPs. The NSF funded the vBNS (Very High-Speed Backbone Network Service), a non-commercial research-oriented backbone operating at 155 megabits per second. The NSF provides transitional funding to the regional research and educational networks, as these networks are now required to pay commercial backbone providers rather than receiving free interconnection to NSFNET. Finally, the NSF also remains involved in certain Internet management functions, through activities such as its cooperative agreement with SAIC Network Solutions Inc. to manage aspects of Internet domain name registration.

Since the termination of federal funding for the NSFNET backbone, the Internet has continued to evolve. Many of the largest private backbone providers have negotiated bilateral "peering" arrangements to exchange traffic with each other, in addition to multilateral exchange points such as the NAPs. Several new companies have built nationwide backbones. Despite this increase in capacity, usage has increased even faster, leading to concerns about congestion. The research and education community, with the support of the White House and several federal agencies, recently announced the "Internet II" or "next-generation Internet" initiative to establish a new high-speed Internet backbone dedicated to non-commercial uses.

As of January 1997 there were over sixteen million host computers on the Internet, more than ten times the number of hosts in January 1992. Several studies have produced different estimates of the number of people with Internet access, but the numbers are clearly substantial and growing. A recent Intelliquest study pegged the number of subscribers in the United States at 47 million, and Nielsen Media Research concluded that 50.6 million adults in the United States and Canada accessed the Internet at least once during December 1996—compared to 18.7 million in spring 1996. Although the United States is still home to the largest proportion of Internet users and traffic, more than 175 countries are now connected to the Internet.

According to a study by Hambrecht & Quist, the Internet market exceeded one billion dollars in 1995, and is expected to grow to some 23 billion dollars in the year 2000. This market is comprised of several segments, including network services (such as ISPs); hardware (such as routers, modems, and computers); software (such as server software and other applications); enabling services (such as directory and tracking services); expertise (such as system integrators and business consultants); and content providers (including online entertainment, information, and shopping).

The value of networks to each user increases as additional users are connected. For example, electronic mail is a much more useful service when it can reach fifty million people worldwide than when it can only be used to send messages to a few hundred people on a single company's network. The same logic applies to the voice telephone network.

However, this increasing value also can lead to congestion. Network congestion is an example of the "tragedy of the commons:" each user may find it beneficial to increase his or her usage, but the sum total of all usage may overwhelm the capacity of the network. With the number of users and host computers connected to the Internet roughly doubling each year, and traffic on the Internet increasing at an even greater rate, the potential for congestion is increasing rapidly. The growth of the Internet, and evidence of performance degradation, has led some observers to predict that the network will soon collapse, although thus far the Internet has defied all predictions of its impending doom.

Two types of Internet-related congestion may occur; congestion of the Internet backbones, and congestion of the public switched telephone network when used to access the Internet. These categories are often conflated, and from an end user standpoint the point of congestion matters less than the delays created by the congestion.

Congestion of the Internet backbones results largely from the shared, decentralized nature of the Internet. Because the Internet interconnects thousands of different networks, each of which only controls the traffic passing over its own portion of the network, there is no centralized mechanism to ensure that usage at one point on the network does not create congestion at another point. Because the Internet is a packet-switched network, additional usage, up to a certain point, only adds additional delay for packets to reach their destination, rather than preventing a transmission circuit from being opened. This delay may not cause difficulties for some services such as E-mail, but could be fatal for real-time services such as video conferencing and Internet telephony. At a certain point, moreover, routers may be overwhelmed by congestion, causing localized temporary disruptions known as "brownouts."

Backbone providers have responded to this congestion by increasing capacity. Most of the largest backbones now operate at 155 Mbps (OC-3) speeds, and MCI has upgraded its backbone to OC-12 (622 Mbps) speed. Backbone providers are also developing pricing structures, technical solutions, and business arrangements to provide more robust and reliable service for applications that require it, and for users willing to pay higher fees.

Internet backbone congestion raises many serious technical, economic, and coordination issues. Higher-bandwidth access to the Internet will be meaningless if backbone networks cannot provide sufficient end-to-end transmission speeds. Moreover, the expansion of bandwidth available to end users will only increase the congestion pressure on the rest of the Internet. This has significant implications to local exchange carriers. Most residential subscribers reach their ISPs through dial-up connections to LEC networks. A modem at the customer premises is connected to a local loop, which is connected to a switch at a LEC central office. ISPs also purchase connections to the LEC network. In most cases, ISPs either buy analog lines under business user tariffs (referred to as "1 MBs") or 23-channel primary rate ISDN (PRI) service. When a call comes into an ISP, it is received through a modem bank or a remote access server, and the data is sent out through routers over the packet-switched Internet. Both subscribers and ISPs share usage of LEC switches with other customers.

It is becoming increasingly apparent that the current flat charge pricing structure for Internet access contributes to the congestion of LEC networks. Switch congestion can arise at three points in LEC networks—the switch at which the ISP connects to the LEC (the terminating switch), the interoffice switching and transport network, and the originating end user switch. The point of greatest congestion is the switch serving the ISP, because many different users call into the ISP simultaneously.

LECs have engineered and sized their networks based on assumptions about voice traffic. In particular, several decades of data collection and research by AT&T, Bellcore, and others has shown that an average voice call lasts 3–5 minutes, and that the distribution between long and short calls follows a well-established curve. Because very few people stay on the line for very long periods of time, there is no need for LEC switches to support all users of the switch being connected simultaneously. Instead, LEC switches are generally divided into "line units" or "line concentrators" with concentration ratios of typically between 4:1 and 8:1. In other words, there are between four and eight users for every call path going through the switch. Call blockage on the voice network tends to be negligible because a significant percentage of users are unlikely to be connected simultaneously.

The distribution of Internet calls differs significantly from voice calls. In particular, Internet users tend to stay on the line substantially longer than voice users.

Because LEC networks have not been designed for these longer usage patterns, heavy Internet usage can result in switches being unable to handle the load ("switch congestion"). Internet connections tie up a end-to-end call path through the PSTN for the duration of the call. When the average hold time of calls through a switch increases significantly, the likelihood of all available call paths through the switch being in simultaneous use also goes up. If a particular line unit has an 8:1 concentration ratio, only one eighth of the subscriber lines into that line unit need to be connected at one time in order to block all further calls.

Because of the relatively short average duration of voice calls, the primary limiting factor on the capacity of current digital switched for voice calls is the computer processing power required to set up additional calls. Computer processing power can be expanded relatively easily and cheaply, because modern switch central processing units are designed as modular systems that can be upgraded with additional memory and processing capacity. However, Internet usage puts pressure not on the call setup capacity of the switch, but on the number of transmission paths that are concurrently open through the switch.

As may be appreciated from the foregoing the traffic problems that exist with respect to providing reliable telephony communications, particularly long distance communications, involves intertwined limitations that exist separately and in combination in the Internet and in the public switched telephone network.

DISCLOSURE OF THE INVENTION

SUMMARY OF INVENTION

According to the invention there is provided a switched telephone network arranged in a manner to enable packet voice communication between telephone terminals via multiple redundant packet switched networks. The packet switched networks may utilize different protocols, be operated by different entities, and have primary functions other than voice communication. In one preferred embodiment of the invention packet voice communication may be provided over internetworked networks, such as the Internet, and alternately over a packet switched network whose primary function is control of a circuit switched telephone network. The common channel interoffice switching system (CCIS) of a public switched telephone network (PSTN) is a preferred example.

A voice communication link may be established from telephone terminal to telephone terminal via the Internet, the quality of voice communication may be monitored, and the link may be transferred to the common channel interoffice signaling network if and when the quality of voice communication deteriorates beneath a pre-established norm. The invention provides a means for monitoring the links of the common channel interoffice signaling system carrying the packetized voice communication and collecting the information needed to permit charging for the voice communication by time duration or by cells used to carry the packetized voice signal. The customer may be provided with the option of establishing the norm for diversion of the communication, or may elect which path is to be selected as the primary path.

OBJECTS OF THE INVENTION

It is a primary object of the present invention to provide a solution to the foregoing problems.

It is another object of the invention to provide enhanced reliable telephony service through varied redundant networks operating in combination.

It is yet another object of the invention to provide such service through mediated selection of an optimal path through such networks, wherein the mediation may be controlled by selectable parameters.

It is a further object of the invention to provide such service wherein the path is customer selectable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Applicant's above identified copending parent application Ser. No. 08/634,543, filed Apr. 18, 1996, Public Internet Protocol Transport Network, describes a dual PSTN and Internet communication system which provides a network and methodology for facilitating telephone use of the Internet by customers on an impromptu basis. Provision is made to permit a caller to set-up and carry out a telephone call over the Internet from telephone station to telephone station without access to computer equipment and without the necessity of maintaining a subscription to any Internet service. Usage is made of CCIS (common channel interoffice signaling) signaling to set up the call and establish the necessary Internet connections and addressing. Calls may be made from telephone station to telephone station, from voice capable computer to voice capable computer, or from telephone to computer or computer to telephone.

Applicant's above-identified copending parent application Ser. No. 08/698,713, filed Aug. 16, 1996, Internet Telephone Service, describes an improved version of that system of networks which enables wireless telephone access to Internet telephony.

Applicant's above identified copending parent application Ser. No. 08/790,888, Internet Telephone Service with Mediation, describes yet another improvement providing dual path customer access to the ISP with traffic mediation to alleviate overload of the local PSTN between the customer and ISP (Internet Service Provider) circuits.

While each of these systems provides significant improvement of previously available Internet telephony service, they do not address the totality of overload conditions described in detail above.

Figure 1:
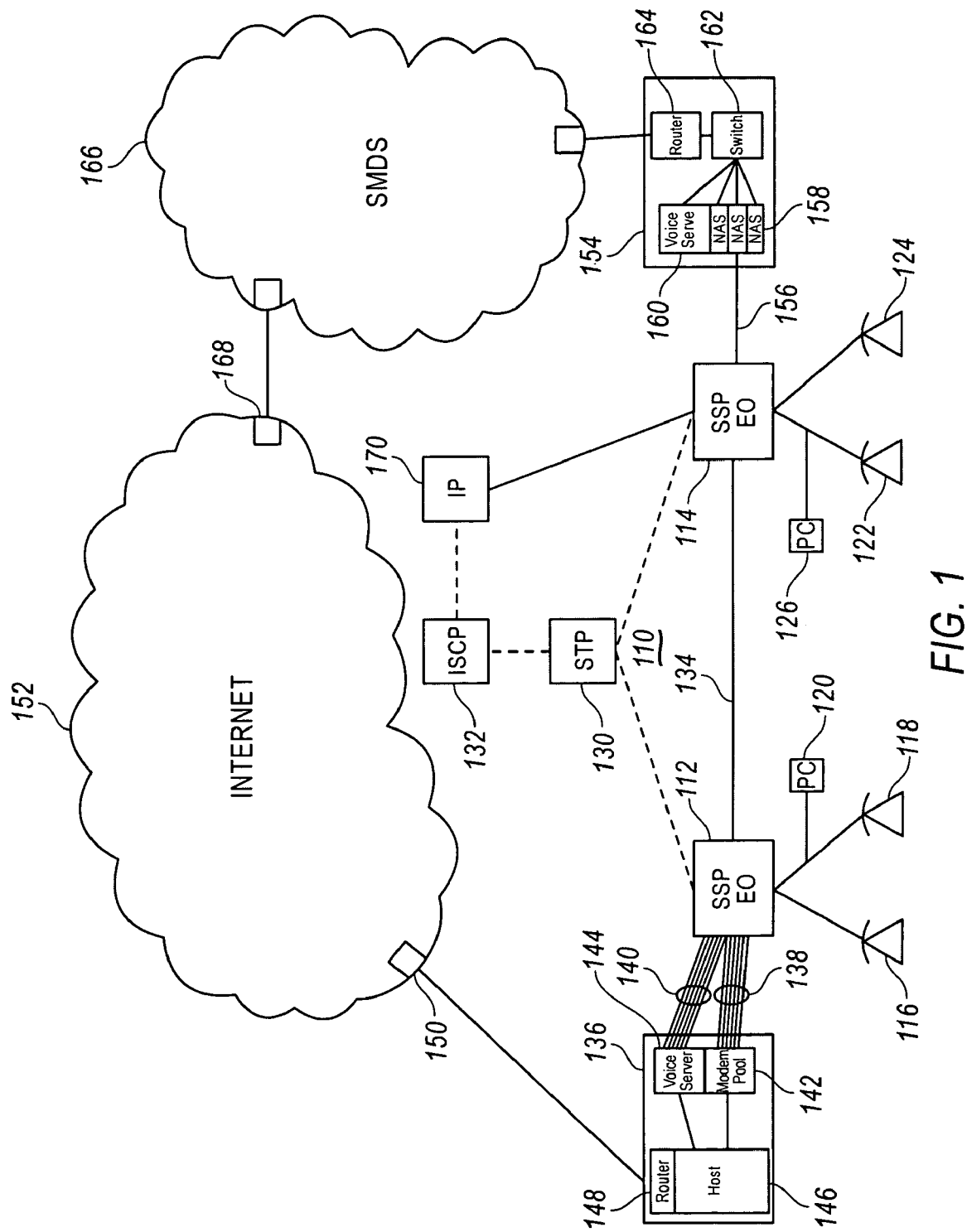
FIG. 1 shows a simplified block diagram of the architecture of one embodiment of a redundant telephony communication network.

Referring to FIG. 1 there is shown a simplified block diagram of the architecture of a preferred embodiment of the present invention which provides relief from another aspect of the multifaceted overload problem. FIG. 1 shows at 110 a public switched telephone network (PSTN) illustratively represented by a pair of SSP (service switching point) capable central office switching systems 112 and 114. The switching system 112 serves as end office for a plurality of customer or subscriber stations such as the telephones 116 and 118 and computer 120. These customer stations or terminals are connected to the central office switching system by local loops 121. In a similar manner the central office switching system 114 serves telephone terminals 122 and 124 and computer or PC 126 via local loops 128.

The central office switching systems 112 and 114 are SSP equipped and connected to an advanced intelligent network or AIN as represented by STP 130 and ISCP 132. The links between the STP, ISCP, and SSP equipped switching systems comprise packet switched data links carrying signaling system 7 (SS7) protocol signals. The central office switching systems are connected by trunks 134 and tandem switches (not shown).

The Internet access plant of a public Internet service provider (ISP) 136 is connected to the central office switch 112 via a first hunt group of lines 138 and a second hunt group of lines 140. The ISP facility is here shown in simplified form comprising a modem pool 142, a voice server pool of application processing units 144, a host or server 146, and router 148. The router 148 is connected to a gateway router 150 to connect to the Internet, shown as a cloud 152.

A telephone company (Telco) access hub 154 is connected to the central office switching system 114 by a plurality of lines, which may include POTS or plain old telephone service connections as well as ISDN links shown collectively at 156. The Telco's hub 154 may be of the type shown and described in detail in the common assignee's copending application Ser. No. 08/815,363, filed Mar. 11, 1997, and entitled Public IP Transport Network, which application is incorporated herein in its entirety by reference.

The Telco access hub is here shown in simplified fashion as comprising a pool of network access servers (NASs) 158, a pool of voice servers 160, an Ethernet packet switch 162, and a gateway router 164. The gateway router is connected via a Telco switched multimegabit data service (SMDS) network 166 to the Internet 152 via an Internet gateway router 168. The voice servers may have Internet interface processors (not here separately shown) with functionality presently to be described.

The Telco access hub is designed to provide access to the Internet and related IP data transport service for users or customers employing a wide variety of procedures and intranetwork protocols. The hub provides Internet access to widespread local areas served by a public switched telephone network. Customers may obtain the use of various types of ports on the Telco platform such as, by way of example, analog 28.8 Kb/s service, ISDN service, dedicated ports for SMDS (switched multimegabyte data service), frame relay, T1, DDS or other available services. As a matter of convenience the hubs will be collocated with central office switching systems and oftentimes may be sited in the same building. Each hub and its equipment will be operated, maintained and provisioned by Telco personnel.

The current availability of the Telco SMDS service, makes it feasible to provide virtually immediate high speed service to business customers capable of interfacing via SMDS. This facilitates limitation of the load or traffic on the gateway routers in the hubs inasmuch as the SMDS signals may be bypassed around the router.

A key component of Telco provided Internet access for the region which it serves is the LATA hub. One such hub is provided for each LATA. Dedicated access is offered from such LATA hubs and will support connectionless services such as frame relay or SMDS. These are currently tariffed fast packet services which are non-distance sensitive. Other presently tariffed services also will be available from such LATA hubs, such as DDS or T1, however these services involve point to point circuits which require additional hardware and are distance sensitive. The Telco access system would allow Internet service provider customers such as UUNet, PSI, and the like, to provide service and seek additional users, while obtaining immediate transport from an alternate source.

The main module of equipment in the hub is the gateway router. The gateway router is connected via redundant links to the Telco SMDS network or "cloud" and thence to the Internet at large. The SMDS links may be 34 Mb/s or T1 links or any combination thereof or of similar links.

The Internet Protocol Routing Service (IPRS) provided by the hub provides for the collection, concentration and management of the customers traffic. IP Routing Service comprises network routers located at LATA hub sites that will collect the customer's (ISP's) end user traffic and concentrate it for connection and transport over a Telco Exchange Access Switched Multi-Megabit Data Service (XASMDS) Subscriber Network Interface.

The operation of this aspect of the system may be described as follows. A public Internet service provider or ISP, such as the ISP 136, may be increasing its customer base and experiencing circuit overload in the Telco network to its retail customers. By way of example, the overload is evidencing itself most adversely in the occurrence of an objectionably high number of busy signals to dial-up customers. The dial-up customers are within the region of the local exchange carrier (LEC) or Telco operating the PSTN which includes the central office switching systems 112 and 114. The Telco offers a public IP transport service through various contract arrangements. This includes use of its AIN equipped network, access hub, and SMDS network for connection to the Internet.

The ISP arranges with the Telco for the Telco to provide for the ISP a specified number of lines to the Telco's Internet access hub, with a sufficient capacity to provide virtually delay free connection to the Internet. The arrangement between the two companies may constitute a continuous lease of lines and access hub capacity by the ISP, or alternatively, may constitute a guarantee of adequate capacity to handle specified overload. As part of the arrangement the Telco will make available to the ISP an AIN/ISCP/IP monitoring and control functionality to provide transfer of load under conditions specified by the ISP.

Thus the AIN control network in FIG. 1 may be provided with an Intelligent Peripheral (IP) 170 of the type described in detail in the above identified copending application Ser. No. 08/816,227. The links between the STP, ISCP, and SSP equipped switching systems comprise packet switched data links carrying signaling system 7 (SS7) protocol signals. The intelligent peripheral 170 is connected to the SSP equipped switching system 114 by a voice and data link which may preferably comprise an ISDN link. The IP connected to the ISCP by a data link separate from the common channel signaling system which may use a signaling protocol such as TCP/IP, a generic data interface (GDI), or a like protocol.

As is described in further detail in the aforementioned copending application Ser. No. 08/816,227, the Telco installs in storage or databases in the ISCP and in the IP, tables of parameters and processing programs which are provided or specified by the ISP. Such parameters may be set for some or all of the dial-up numbers used by the ISP and served by the Telco in the region. The parameters are used to construct the operating algorithms. The experience of operating with the algorithms permits specification of various thresholds designed to signal imminent overload and to trigger preventive action, such as line redirection. The parameters and thresholds may also specify discontinuing the line redirection based on a change in the subsequent values of the same or additional parameters. Discontinuance of redirection may be predicated on "discontinuance" thresholds supplied by the ISP. In a simple case the ISP may direct discontinuing the line redirection when the threshold which was originally exceeded is no longer being exceeded.

While the foregoing describes an arrangement which provides significant improvement in minimizing or obviating network overload in a retail customer obtaining dial-up access to the Internet, there remains the problem of overload in the Internet itself, as previously described. Such overload is particularly serious in the case of Internet telephony, where delay time may rapidly produce an unacceptable quality of service.

The common assignee's copending application describes a network and method which addresses this problem by initially checking the quality of telephone service which is currently available on the Internet, and establishing an Internet telephone call only if that quality is acceptable to the prospective calling party. Details of this methodology are explained in detail in above mentioned copending application Ser. No. 08/821,027, which is incorporated by reference herein in its entirety.

However, it is also possible that the quality of telephone service available on the Internet may be acceptable at the time that the call is established, but may deteriorate during the call. The problem created by that situation may be ameliorated in the manner now described in relation to FIGS. 2, 3, and 4.

Figure 2:
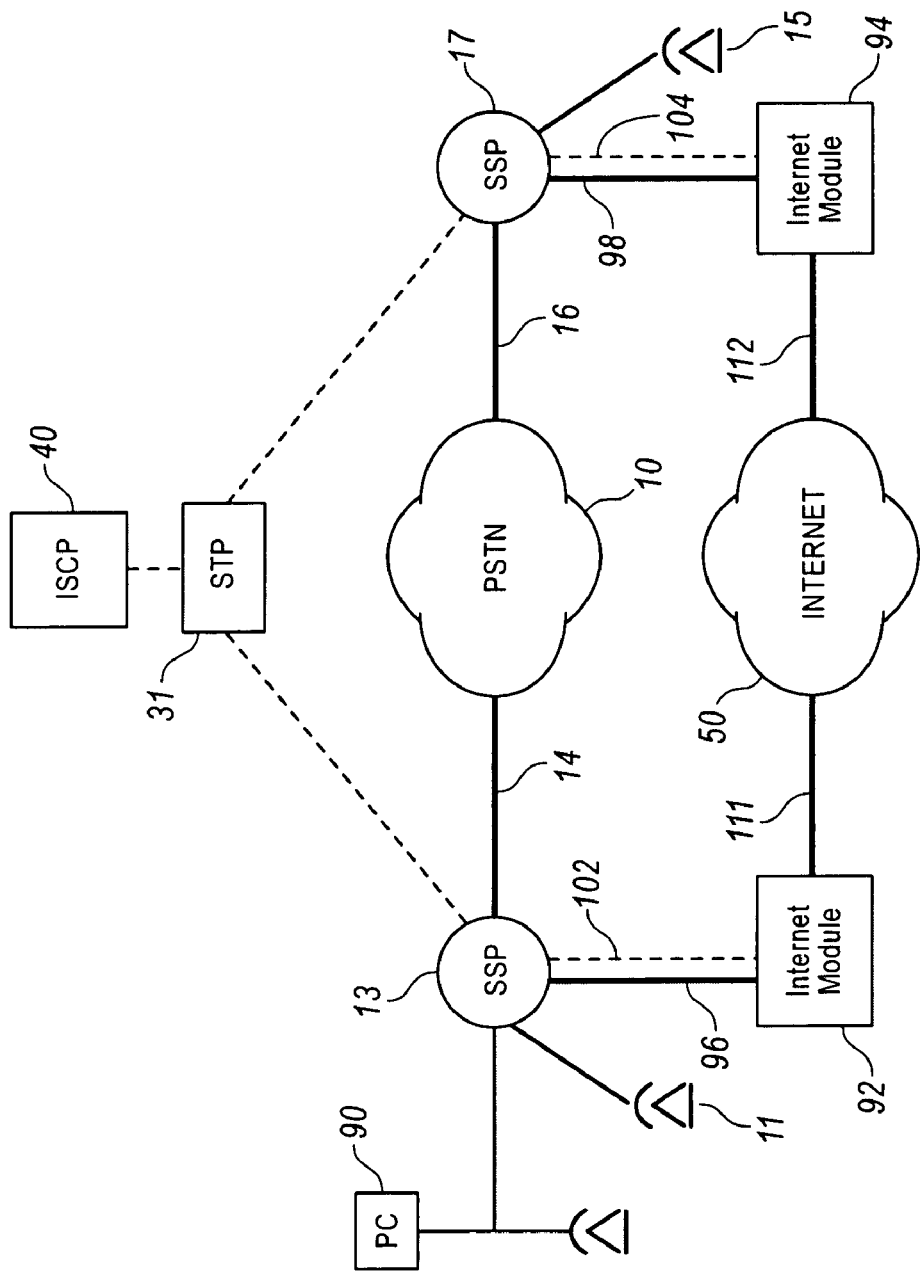
FIG. 2 shows a simplified block diagram of the architecture of another redundant telephony communication network.
Figure 3:
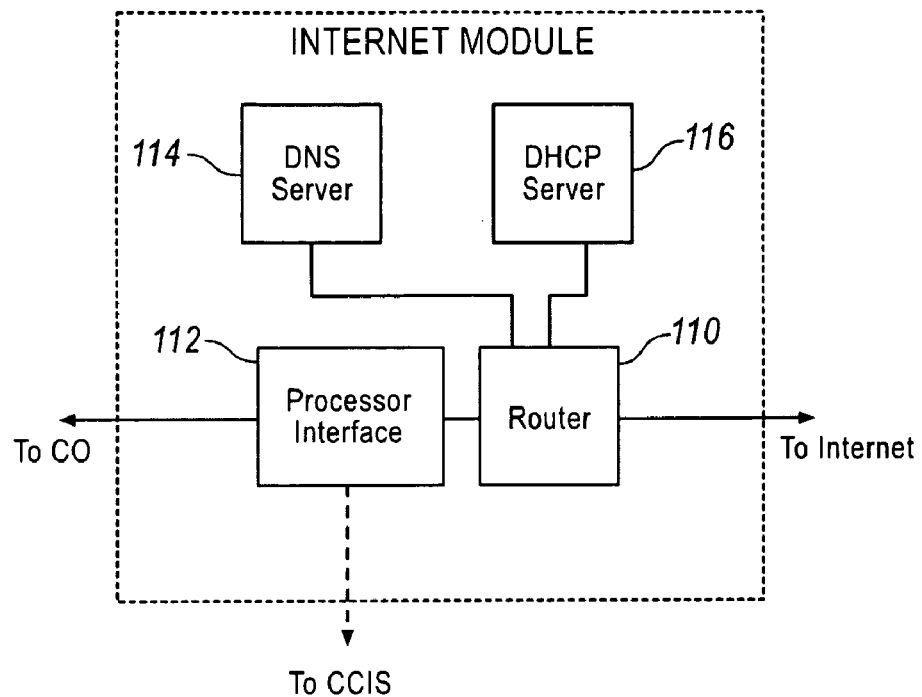
FIG. 3 illustrates the functional architecture of one embodiment of an Internet Module for use in the communication system shown diagrammatically in FIG. 2.

Using the architecture illustrated in FIGS. 2 and 3, the quality of service existing in a data packet network during the course of a voice call through the Internet is monitored. A minimum acceptable level of service may be predefined with a threshold quality level stored in the user's Call Processing Record (CPR) in the AIN Integrated Services Control Point (ISCP). If the monitored quality is maintained in excess of the stored threshold, communication of the call continues through the established course of transmission. If the measured quality of service on the data network is not satisfactory, the routing of the call is changed to communication solely through a voice telephone network connection, which may include an Interexchange Carrier link, without terminating the call. The packet data network is thereby bypassed to obtain voice grade quality while maintaining the call.

FIG. 2 shows a simplified block diagram of an AIN controlled PSTN arranged in an architecture for implementing this improvement. Referring to FIG. 2, SSP capable central offices 13 and 17, which may be located in the same or different states and regions, are connected by trunks 14 and 16 respectively to the PSTN indicated by a cloud 10. Each central office is connected by local loops to subscribers customer premises equipment (CPE) such as telephone terminals 12 and PC 90. The telephone 12 may be a standard telephone used for Plain Old Telephone Service (POTS), with conversion of analog voice to digital signals performed at a central office, or a so-called "Internet Phone" that outputs digital voice signals. The SSPs 13 and 17 are connected by CCIS links to STP 31 which in turn may be connected to ISCP 40. While the STP functionality is here shown as constituting a single STP it will be appreciated that this is for the purpose of simplicity only and that a hierarchy of STPs may be involved.

Each of the central office SSPs 13 and 17 is connected to Internet Module or voice server 92 and 94, respectively, by T1 trunks 96 and 98. Alternatively, the Internet Module hardware may be situated at the central office and associated with the switching system. The Internet Modules or voice servers may be provided with SSP capabilities and connected into the CCIS network directly to an STP or, as illustrated by the links 102 and 104, to the SSPs 13 and 17. The Internet Modules may be linked together for signaling purposes by conventional F links. The Internet Modules are connected to the Internet cloud by T1/T3 trunks 111 and 112.

The functional architecture of one embodiment of an Internet module which may be utilized in this arrangement is shown diagrammatically in FIG. 3. The Internet Module includes a gateway router 310 of the type now generally used in Internet practice, such as shown in FIG. 1 and described in related application Ser. No. 08/634,544, referenced above. An interface with processing capability is illustratively shown at 112. Connected to the router are a Domain Name Service (DNS) server 114 and a Dynamic Host Configuration Protocol (DHCP) server 116 of the type conventionally used by Internet Service Providers in existing Internet Service. It will be understood that while the DNS and DHCP are here shown as elements of the Internet module they may constitute a DNS and a DHCP connected to the Internet. The router interface is connected to the central office and to the CCIS network while the router is connected to the Internet.

Figure 4:
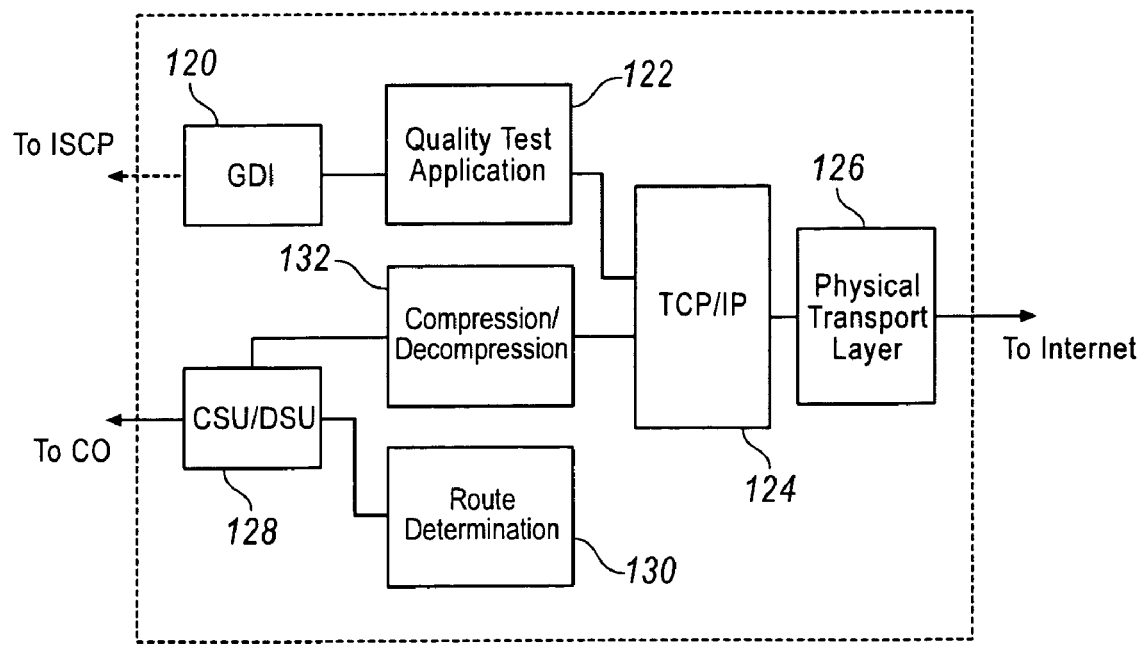
FIG. 4 is a block diagram that represents the functionality of the processor interface of the Internet Module shown in FIG. 3.

FIG. 4 is a block diagram that represents the functionality of the processor interface 112 and the router 110. The processor contains a common Generic Data Interface (GDI) 120 for communicating signaling messages with the ISCP over the common channel signaling network. Data communication by the gateway router of both signaling and information content through the Internet (or other equivalent packet network) occurs through TCP/IP protocol 124, packets being transmitted and received through physical transport layer 126. The physical transport layer may comprise Asynchronous Transfer Mode (ATM), frame relay or some other type of data communication mode.

While message and signaling communication with the common channel signaling network occurs through the GDI, communication of voice data is made through the Channel Serving Unit, Digital Serving Unit (CSU/DSU) 328. This unit, which may physically comprise a digital line card in the processor with standard 24 digital voice line inputs, packetizes voice data received from the telephone central office. The CSU/DSU coordinates with route determination unit 130 to identify packets, termination phone numbers and routes to the network termination gateway router. The route determination information is included in each packet for the data received from the originating central office SSP. The packetized 132, before being sent to the TCP/IP stack and physical transport layer for transmission to the far end gateway router. To complete transmission to the destination telephone, the termination router decompresses the received packets, depacketizes back to voice data which is then routed to the destination PSTN. Two way capability for each of the functions is provided for communication in both directions. While shown for illustrative purposes as separate blocks, the route determination and compression/decompression functions, as well as the quality test application, may be run, for example, by a UNIX-based computer.

The foregoing arrangements provide for relief from various aspects of the overall network overload problem. Relief for overload in the Internet itself is provided by diverting voice communication via the trunked PSTN. While this is generally acceptable for short haul voice communication it leaves something to be desired in providing relief for long haul traffic. Traffic of that type increases the load on multiple switching systems and interconnecting trunks. By way of example, completing a telephone call over the PSTN in even a limited area, such as the northern Virginia area, may involve the call going through as many as eight to ten offices or switching systems.

Figure 5:
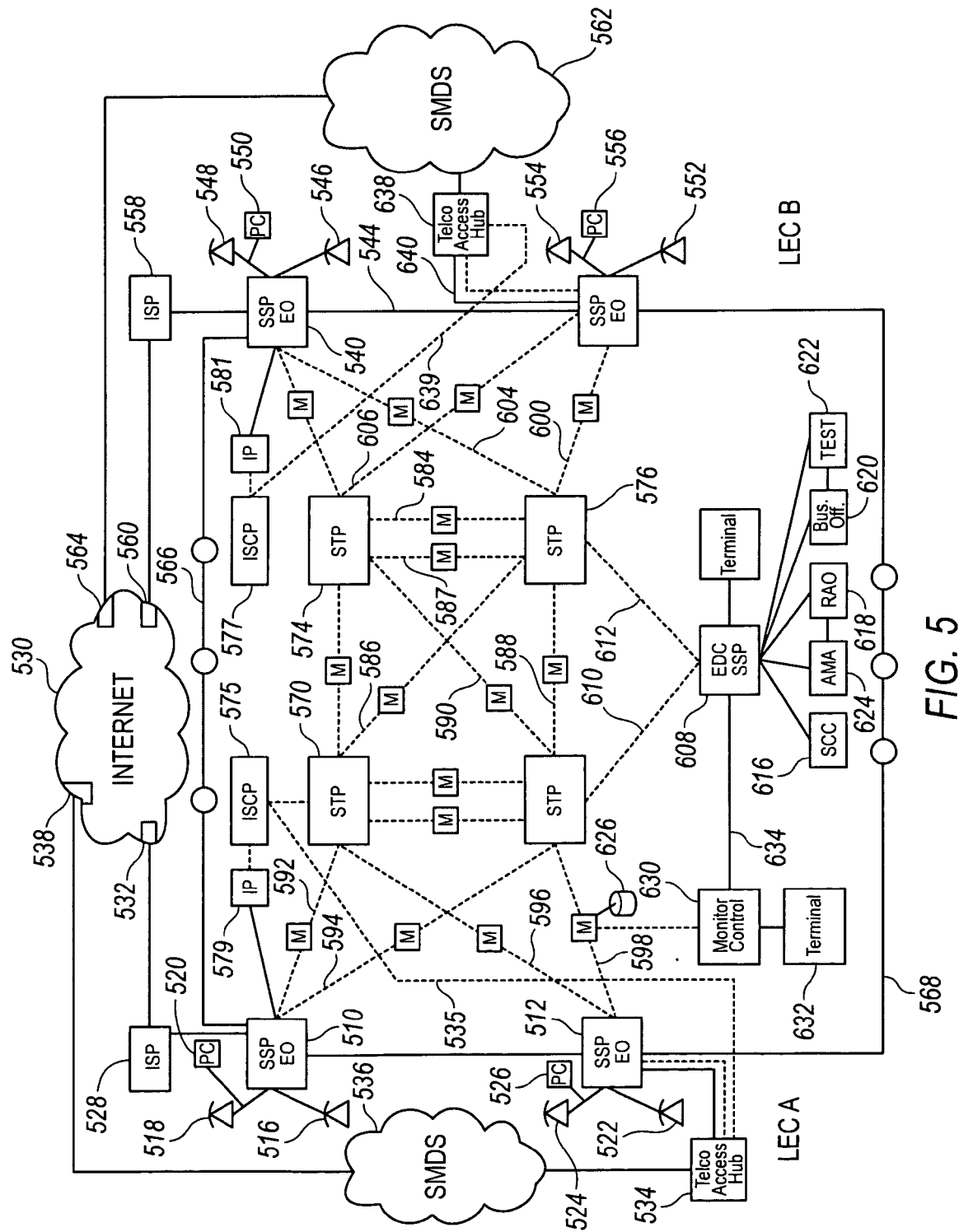
FIG. 5 shows in diagrammatic form a communication system which may be used for redundant network telephone communication according to one preferred embodiment of the present invention.

FIG. 5 illustrates a preferred embodiment of the present invention which provides additional relief. According to this embodiment there is provided a still further additional path to relieve congestion not only on the Internet but also on the PSTN or PSTNs which may be required to supply alternate routes.

Referring to FIG. 5, a first regional local exchange carrier (LEC) network A is represented by SSP equipped end offices (SSP/EOs) 510 and 512. SSP/EOs are connected by a representative trunk or trunks 514. These SSP/EOs 510 and 512, respectively, serve subscriber stations represented by telephone terminals 516 and 518 and personal computer (PC) 520, and telephone terminals 522 and 524 and PC 526. In addition to the telephone terminals and PCs, LEC A also serves an ISP 528 via SSP/EO 510. ISP 528 may be of the type illustrated in FIG. 1. The ISP 528 connects to the Internet 530 via a router 532 in the manner shown in FIG. 1. The LEC A also provides through SSP/EO 512 a Telco operated access hub of the type described in connection with FIG. 1. The access hub is connected to the SSP/EO by both voice and data links. The access hub also connects to the LEC SMDS network 536, and from there to the Internet 530 through a router 538.

The distal LEC B is similar to LEC A. LEC B is represented by SSP equipped end offices (SSP/EOs) 540 and 542 connected by a representative trunk or trunks 544. These SSP/EOs serve subscriber stations represented by telephone terminals 546 and 548 and personal computer (PC) 550, and telephone terminals 552 and 554 and PC 556. LEC B also serves an ISP 558 via SSP/EO 540. This ISP also may be of the type illustrated in FIG. 1. The ISP connects to the Internet 530 via a router 560 in the manner shown in FIG. 1. The LEC B also serves through SSP/EO 542 a Telco operated access hub 638 of the type previously described. The access hub connects to the LEC SMDS network 562, and from there to the Internet 530 through a router 564. The Telco access hubs 534 and The LECs A and B are connected by representative trunks 566 and 568 via tandem switches represented by the circles in the trunks.

The telephone system network shown in FIG. 5 is controlled by an advanced intelligent network (AIN), which includes a first mated pair of STPs 570–572 and a second mated pair of STPs 574–576. The mated pairs of STPs are connected to one another by C links 578, 580, 582, and 584. Each mated pair serves its respective transport area. Each STP is connected to an ISCP 575 and 577 and an Intelligent Peripheral (IP) 579 and 581. The IPs may be of the type described in detail in above referenced application Ser. No. 08/816,227. Such IPs provide storage, speech recognition, speech server and other capabilities. The IPSs are connected to the ISCPs and SSPs as described in connection with FIG. 1. The Telco access hubs 534 and 638 are also connected to their respective ISCPs 575 and 577 by GDI links 535 and 639, respectively.

STP 570 is connected to STP 574 by B link 585 and to STP 576 by D link 586. STP 572 is connected to STP 576 by B link 588 and to STP 574 by D link 590. The STPs are connected to SSPs 510, 512, 540, and 542 by A links 592–598.

The SS7 network constitutes a highly redundant data network, generally a 56 K switched data circuit. By way of example, an SS7 message from end office 510 to end office 540 might travel any one of eight possible routes. It could go from 510 to STP 570, from STP 570 to STP 574, STP 574 to SSP or EO 540. One variation on that route would be from STP 570 down the D link 586 to STP 576 to SSP/EO 542, and so forth. In the event a link between STP 570 and SSP/EO 540 was lost, an SS7 route could be established from end office 510 to SSP/EO 542 via STP 570 to STP 574 and the via C link 584 to STP 576 and then via A link 600 to SSP/EO 542. However, that would be an undesirable route unnecessarily using the C link. A links provide direct connectivity while C links provide circuitous routes using extra switches, a situation to be avoided. An alternate route would be from STP 570 via D link 586 to STP 576 via A link 600 to SSP/EO 542.

As is described in detail in the common assignee's above-identified pending application Ser. No. 08/353,281, filed Dec. 5, 1994, and continuation cases above identified, it has been discovered by the applicant that digitized voice may be transported in TCAP format in SS7 signals. It has further been discovered by the applicant that such SS7 voice transport may be carried out in substantially real time through the use of suitable vocoders, PADS, and routers, as described in the aforesaid applications. It is a basic purpose of this invention to utilize the SS7 network as an alternate multi-purpose network for transporting voice signals between calling and called telephone terminals. To this end the SSP/EOs are appropriately enabled as described. The SS7 network may be selected for packetized voice transport as a result of traffic overload in either or both the Internet and/or the PSTN trunked voice network or as a matter of choice.

In normal use of the PSTN the analog voice signal entering the originating end office, such as SSP/EO 512 in FIG. 5, is conventionally transformed in the end office switching system to a digital format and transported in that format through the trunked network 568 to the terminating end office, such as SSP/EO 542. In order to relieve or prevent traffic overload in either or both the Internet or the PSTN, according to the present invention, those signals in whole or in part are transported via the CCIS SS7 network. The digitized voice is packetized by the end office SSP/EO 512 with an appropriate routing label and handling instructions. The packets are then dispatched through the CCIS or SS7 network to the terminating end office SSP/EO 542.

This routing avoids use of the PSTN trunked network and its multiple intervening switching systems. As previously described, use of the PSTN may tie up from 8 to 10 switching offices for a call between two stations in even a limited area. If that same call is handled over the SS7 network it goes directly through that packet network without tying up any switches between the originating office and the terminating office.

This routing also relieves traffic on the lines or trunks used to connect the voice signals to the Telco access hub 534 or the ISP 528, either of which might be used to route the call via the Internet. Still further, this CCIS/SS7 routing reduces traffic in the backbone networks of the Internet and thereby avoids the voice signal degradation which such overload causes.

It is a feature of the invention that the redundancy of the SS7 network and packet switching techniques permits packets traveling different routes to the same destination. This redundancy is utilized as a feature of the invention to enable the existing SS7 network to handle the digital packet voice communication and thereby ameliorate or eliminate traffic overload, without requiring modification of the SS7 system. The SS7 network has been designed to perform its conventional signaling function while utilizing no more than approximately fifty percent of the network capacity. It is a feature of the invention that the availability of spare capacity is determined before diverting voice or other trunk signals into the CCIS SS7 network.

It will be appreciated that this feature of the invention provides a significant degree of solution to the telephone network and Internet congestion or traffic overload problems by opening an entirely new traffic path to carry the load. The amount of traffic diverted from one of the three networks to another may vary depending on fixed or dynamic parameters which may be designed into the network for automatic or manual actuation. The load condition in the CCIS network is monitored prior to the time that traffic is diverted thereby preventing overload of the critical CCIS control network.

According to one embodiment of the invention, there is provided a system and method for utilizing the SS7 or common channel signaling network to perform the still additional function of detecting predetermined events and/or the imminence of predetermined events, and then blocking or controlling those events from their incipiency. In this case it may be desired to divert or redirect calls to a predetermined destination, such as the SS7 network, when the rate of call attempts or calls exceed a specified parameter. One example of such a parameter may be the number of specified occurrences per time period (minute or fraction thereof, hour, etc.).

This is accomplished utilizing the CCIS or SS7 network in conjunction with programmable monitors associated with the CCIS links to the STPs, and control processors for those monitors. According to the invention these monitors are programmed to trap and temporarily record predetermined CCIS signaling data such as call set up messages, associated with specific events, which it is desired to block or control. Call setup messages utilize a call setup protocol known as the Integrated Services Digital Network (ISDN) User Part (ISUP) call setup protocol. The ISUP call setup protocol is described in the Bellcore standards, "TR-NWT 000317, Switching System Generic Requirements for Call Control Using the Integrated Services Digital Network User Part (ISDNUP)", "TR NWT000394, Switching System Generic Requirements for Interexchange Carrier Interconnection Using the Integrated Services Digital Network User Part (ISDNUP)", and "TR-NWT000444, Switching System Requirements Supporting ISDN Access Using the ISDN User Part", which are hereby incorporated by reference.

The monitors on the CCIS links to a specified SSP may be programmed to trap selected call set up messages which inquire as to the availability of a line. The same monitors may be programmed to trap call set up messages which inquire as to the availability of a line and indicate that it is not available. Set up signals which indicate unavailability, such as in the case of a busy line, comprise one indication of the maximum load on the available voice circuits. Such a condition may be relieved by the provision of additional lines from the end office to the Internet server. However it is desired to minimize overloading with the existing network. When the occurrence of line busy conditions approaches or exceeds a pre-specified parameter it may provide an indication of the approach of an unacceptable degree of congestion in the voice circuits.

The monitors provide an output to an event detection center (EDC) processor having an SSP capability which is linked to the STPs. The SS7 signaling to and from the STPs can be monitored to maintain a continuous check on the load status of the CCIS SS7 network. The link to the EDC makes this information available to the EDC. According to one embodiment of the invention, the event detection center processor reacts to this information to block or control (such as diverting) specified calls via the CCIS network, after ascertaining that usable capacity exists in that network.

According to another feature of the invention, the event control processor communicates with the monitors either via the STP CCS links or via connection to a controller for the monitors. In this manner it is possible to predict the development of a traffic overload in one type of circuit, the normal voice circuits, and to divert some or all of that traffic into a different type of network in a unique manner to avoid the actual occurrence of the undesired overload situation. The different network, i.e., the CCIS network, thus acts to perform the multiple functions of handling conventional PSTN network control, activating the monitor network to provide warning signals, acting on warning signals from the monitor network control to and direct diversionary switching through CCIS signaling, transporting the diverted signals via the CCIS network, and billing for the call.

Another feature of the invention lies in the fact that no diversion of signals onto the CCIS network will occur if there exists a possibility that the addition of such diverted signals would cause an overload on the CCIS network. In addition to the foregoing, the invention provides that the SS7 network and event control processor may be arranged to supply the additional function of billing for voice calls via the SS7 network as well as the Internet.

Referring to FIG. 5, the above arrangement is now described in additional detail. An Event Detection Center (EDC) 608 includes an SSP and is connected to the common channel signaling network via A links 610 and 612. The EDC includes a processor with associated storage, and operator terminal 614. The EDC is also connected via MF lines to the Switching Control Center (SCC) 616, Revenue Accounting Office (RAO) 618, Business Office (BO) 620, Test Center 622, and Automatic Message Accounting Office (AMA) 624. The business office 620 is connected to the RCMAC (not shown) and to the Test Center. The AMA 624 is connected to the RAO 618.

Each STP is provided with a series of monitors M with one monitor bridged onto each STP link, each monitor having receive and transmit ports. As will be understood by those skilled in the art, each SSP has a point code comprising a nine-digit code assigned to every node in the network. Each operating company has its own network ID normally represented by three digits in the point code. The point code also contains a three-digit cluster number. A cluster can hold 32 SSPs, the SSPs being designated by the final three numbers. According to the invention the monitors M are addressable and have individual point codes for control and programming purposes.

The monitors include processors and temporary storage, as indicated by way of example at 626, connected to the monitor M 628 in FIG. 5. It will be understood that each of the remaining monitors M includes a similar processor and storage. Each of the monitors in a cluster for an STP is connected to a monitor controller 630. The controller 630 includes a processor and storage and may be provided with a terminal 632. The monitors and processors may be of the type described in U.S. Pat. No. 5,475,732, issued Dec. 12, 1995, to Eugene M. Pester III, and assigned to the assignee of the instant application. That patent is incorporated by reference wherein in its entirety.

As described in further detail in the aforesaid Pester Patent, the monitors are controllable from remote stations to set traps which may be customized. Thus the monitors are programmed to trap packets and/or selectable fields and/or field contents on a real time basis to permit extremely rapid response to detected conditions. The system and method of the invention are applicable to not only a localized or regional communications network but also to a virtually unlimited interconnection of such networks. The monitors may comprise monitor circuit cards physically mounted at a monitor controller 630, that holds all monitor cards for that cluster. The monitor controller includes a 486 or the like type controller and memory or storage that keeps track of all 32 monitors and handles any messages.

The controller 630 and its monitors M may be regarded as an interface with the SS7 network. The equipment may be conveniently mounted at or adjacent to the STP with which the monitors are associated. A function of the monitor controller is recording all of the data forwarded by the monitors M.

The controller 630 may be similar to the stage one controller described in the aforesaid Pester Patent. The controller 630 is connected to the event detection center 608 via a data link 634. The monitors may physically constitute a back plane capable of handling multiple cards. The monitor cards themselves include multiple monitors, such as four monitors per card. According to the invention the monitors may be programmed by monitor control signals delivered either via the SS7 or CCS network or via the data link between each monitor M and its associated monitor controller 630. In the first instance control signals may be delivered to specifically addressed monitors over the CCS links 610 and 612 in FIG. 5. In the latter instance the control signals are delivered over the line 634 connecting the EDC 608 to the monitor controller 630 and thence over the data link 636 from the monitor controller 630 to the monitor and its associated processor and storage 626.

The processor in the event detection center 608 may be loaded with the desired program or script via the terminal 614. This script will specify for identified monitors the particular signals or portions of signals to be trapped and the nature of the output signal to be delivered to the monitor controller 630. The monitor controller receives this designated information from all specified monitors in its cluster and provides an output signal to the event detection center processor 608 upon the occurrence of predetermined conditions as specified by the event detection center processor. The event detection processor in turn may respond to the receipt of these output signals from the monitor controller by directing to the SS7 or CCS network over the links 610, 612, routing or other control information to direct the handling of predetermined calls or further process the received signals.

The EDC 608 may be programmed from the terminal 614 or from the ISCP via STPs to trap the desired signals and to react to the receipt of the monitor controller output signal to implement various types of billing. This may be initiated by transmitting a signal to the Automatic Message Accounting (AMA) or Station Message Detail Recording (SMDR) Office for dispatch to the Revenue Accounting Office (RAO) for billing of the service and reporting the events that occurred. Further detail regarding such billing is described in the common assignees copending application Ser. No. 08/547,178, filed Oct. 24, 1995, which application is incorporated by reference herein in its entirety. The arrangement shown in FIG. 5 is capable of providing a means for totalizing the units comprising packetized voice signals over the monitored packet switched network during voice communication over the network.

It will be understood that alternate methods may be used relying on the SS7 signaling to effect billing for SS7 and Internet voice calls. While the data internetwork comprising the Internet has been referred to herein it also will be understood that other data internetworks may be used for voice transport and may be billed in a similar manner. While billing in the public switched telephone network has traditionally been based on time of connection for toll calls, it is within the comprehension of the invention that a "per cell" or the like charge arrangement may be used. This is particularly appropriate for the SS7 or CCIS network when it is used as a backbone packet network in the manner of the present invention. The network which is here provided is particularly suited to such a billing arrangement. Not only is the new system capable of obtaining the necessary data via the SS7 CCIS network, but this also may be obtained on a customized basis from the monitoring and superimposed control that is provided.

The operation of the redundant network system shown in FIG. 5 in response to one illustrative example of one type of overload situation is now described. Using the operator terminal 614 the EDC may be programmed to implement the following script or program:

1. Identify the ISP or Telco access hub to which overload protection is to be implemented. In this example it will be assumed that Telco access hub 638 in FIG. 5 is to be protected.
2. Identify the SS7 or CCIS links to the SSP/EO to which that server is connected and identify the addresses of the monitors on those links. In this example those would be the monitors on links 600 and 606.
3. Send monitor set up signals from the EDC computer via either the SS7/CCIS links or the monitor controller to the identified addressed monitors on the specified links.
4. Through such set up signals program those monitors to trap data signals on the specified links which are caused by a call initiation request signal (IAM) requesting a connection to the designated server. The trapped signals will be stored in the temporary storage associated with the monitors.
5. Program the monitors and monitor controller to send to the monitor controller those stored signals which represent IAM signals which encountered a busy condition on the local link 640 to the Telco access hub 638.
6. Set a threshold limit for such busy conditions per time period, i.e., the rate at which such signals are received. When that threshold is reached, the monitor control sends to the event detection control (EDC) a message to take load reduction action.
7. When the EDC receives a signal that load reduction action is indicated it will check the availability of SS7 network capacity to handle overload. An SS7 network available capacity threshold which is necessary to permit diversion of signals onto the SS7 network has previously been set. The links 610 and 612 from the EDC to the STPs provide the EDC with a continuous indication of SS7 network load conditions.
8. When the EDC receives a signal that load reduction action is indicated, and the EDC has determined that excess capacity is available in the SS7 network, it will broadcast a message to all SSP/EOs in LEC-B. Upon receiving this message each SSP/EO sets its program to switch incoming calls bearing an Internet prefix to the SS7 network. This condition of the switches is maintained until a reset signal restores the switches to their former condition.
9. Once the monitor control signals the EDC that the IAM/busy signal threshold has been reached, the monitor control periodically checks its storage to determine if the threshold was reached during the latest predetermined time period. When the monitor control determines that the rate of arrival of IAM/busy signals has dropped below the threshold, it sends a message to the SSP/EOs to reset their programs to discontinue switching incoming Internet calls to the SS7 network.

The operation of the system and method of the invention pursuant to this programming is now described.

In this example an Internet connection is sought to link a calling telephone to a called telephone without using personal or office computer equipment. The subscriber in this example uses a POTS terminal to initiate an Internet call to a called party at a called POTS terminal. The caller goes off-hook and dials *82. This prefix has been established by the Telco offering the service as a predesignated prefix with which the public may initiate an Internet telephone call through a Telco Internet server or access hub. The dialing of the prefix *82 is followed by the dialing of the directory number of the called party.

Alternative to this procedure the Telco may program its switches or SSP/EOs to react to 1+ or 0+ dialing to suspend and return to the caller a recorded query such as "Type of long distance call?". The voice recognition capability of the IPS 579 and 581 may then be utilized to allow the caller to use a voice signal to select between an Internet or telephone network call. The methodology may, for example, be of the type described in further detail in the common assignee's copending application Ser. No. 08/828,781, filed Mar. 27, 1997, entitled Phonetic Voice Activated Dialing. That application is incorporated by reference herein in its entirety. The Telco may also provide the subscribers the option of choosing an SS7 call.

The local SSP/EO to which the calling terminal is connected responds to the off-hook and receives the dialed digits from the calling station. The SSP/EO switching system analyzes the received digits and determines from the prefix *82 that the call is an Internet call. Responsive to its programming it knows that the call must be completed through the Telco access hub, and that further processing is necessary. In this example it is assumed that the Telco access hub must be reached by a different SSP/EO than the SSP/EO to which the calling telephone terminal is connected. Such would be the case in FIG. 5 if telephone terminal 518 was the originating or calling terminal. In that case SSP/EO 510 would be the originating SSP/EO and SSP/EO 512 would be the destination SSP/EO to reach the Telco access hub 534.

The originating SSP/EO central office suspends the call and determines whether or not the lines from the destination SSP/EO to the Telco access hub are busy. If the called access hub line is busy, the destination SSP/EO notifies the originating SSP/EO via conventional SS7 signaling, and the originating SSP/EO provides a busy signal to the calling station.

When the receiving or destination SSP/EO notifies the originating SSP/EO that the access hub line is busy, this SS7 signal is noted by the monitor on the SS7 link on which that signal traveled. The initial inquiry to the destination SSP/EO and the busy response would be trapped by that monitor pursuant to its programming. Also pursuant to that programming the monitor would send request and busy signal sequence signals to the monitor control. The monitor control maintains a timed record of the number of request/busy signals received and increments that store. The monitor control ascertains whether the addition of the latest count reaches the predetermined threshold rate for such signals. If the threshold has not been reached the count is maintained but no action taken. If the threshold has been reached the monitor control signals the EDC to that effect. Upon receiving such notification the EDC checks for the availability of SS7 network capacity. If such capacity is not available no action is taken.

If excess capacity exists on the SS7 network the EDC broadcasts a message to all SSP/EOs in the network. Upon receiving this message each SSP/EO sets its program to switch incoming calls bearing the Telco Internet prefix to the SS7 network. This condition of the switches is maintained until a reset signal restores the switches to their former condition.

The processing sequence may be as follows for an Internet telephone call which is made after the switches have been set to divert Internet telephone calls to the SS7 network.

The caller goes off-hook and dials *82.

The central office SSP/EO responds to the off-hook and receives the dialed digits from the calling station.

The SSP/EO switching system analyzes the received digits and determines from the prefix *82 that the call is an Internet call.

The originating SSP/EO central office suspends the call and sends a CCIS query message through one or more of the STPs to the destination SSP/EO. However, this query is directed to the ultimate destination SSP/EO, which was identified by the destination telephone number initially dialed by the calling party. The message traverses the SS7 network between the two SSP/EOs.

The ultimate destination SSP/EO receives the query and determines whether or not the called station is busy. If the called station is busy, the ultimate destination SSP/EO so informs the originating SSP/EO.

The originating SSP/EO provides a busy signal to the calling station.

If the called station is not busy, the receiving ultimate destination SSP/EO busies out the called station line by blocking all calls.

The receiving or ultimate destination SSP/EO then informs the originating SSP/EO office that the called line is available and waiting and may be reached through the SS7 network.

The originating SSP/EO receives this message and a virtual connection of the two SSP/EOs is established through the SS7 network.

A telephony communication path from the calling to the called telephone terminal has now been established via the SS7 network.

If the call had been made from a telephone terminal connected to the same SSP/EO makes the busy/not busy determination internally. The switch also knows that it is presently programmed to send Internet calls to the SS7 network. Thus the switch internally directs the call to the SS7 network in the manner described in detail in parent application Ser. No. 08/790,888.

The foregoing operation of the system of the invention provides relief from overload in providing Internet voice communication due to overload in the PSTN access. It is also a feature of the invention that relief is provided where the Internet itself is encountering an overload condition which is producing a degradation of the quality of voice communication which is being supplied. This feature has been described in detail in connection with FIGS. 2–4 and the network illustrated in FIG. 5 includes that functionality. However, the system illustrated and described in relation to FIG. 5 has the additional capability of providing relief from Internet overload not only by diversion to the telephone trunked network, but also by diversion to the SS7 packet network. Not only does this provide the ability to maintain a quality telephone connectivity in the face of Internet overload, it also permits providing this service without having to create additional loading on the trunked telephone network.

According to the invention it is possible to provide multiple classes of telephony communication from telephone terminal to telephone terminal. This not only makes it possible to provide an improved quality of service but also provides a more universal guarantee of a user being able to complete a connection. Multiple options may be provided to the users. Thus the user may select his or her preferred routing at initiation of the establishment of the path. The routing may be changed during a communication to maintain quality.

Improved dial-up access to the Internet improves the reliability of that service for voice communication. If the improved service leads to congestion, the path may be diverted to the SS7 or CCIS network. However the CCIS traffic is monitored and that diversion will not be made if there is no available capacity in that network. If the path is diverted to the CCIS network and traffic approaches an overload point, then voice traffic may be diverted to the trunked network. This is an important feature. The CCIS network is now serving as a backbone packet network but its first priority must be controlling the public switched telephone network. Congestion presents a basic problem on any network and may present complex problems where those networks are interrelated.

The present invention provides not only an improved voice communication medium with redundant paths, but also provide a system and methodology for mediating between the redundant paths. This improves certitude of communication along with improved and monitored quality and maximum access to a minimum cost routing.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of voice communication between two terminals including the steps of:
   establishing a voice communication link between said terminals via a first landline public packet switched network;
   carrying voice information between said terminals over said link;
   monitoring quality of service of communication in said public packet switched network;
   establishing a second voice communication link between said terminals via only a second landline packet switched network when said monitored quality of service departs from a predetermined value.

2. A method according to claim 1 wherein said parameter comprises a measure of the quality of delivered voice signal.

3. A method according to claim 1 wherein said establishment of said second voice communication link occurs automatically in response to the monitored quality of service falling below a predetermined threshold.

4. A method according to claim 1 including the step of transmitting a recorded voice message to the terminal which initiated the communication prior to establishing said second voice communication link.

5. A method according to claim 4 including the step of transmitting a response to said message from said terminal which initiated said communication prior to establishing said second voice communication link.

6. A method according to claim 1 wherein said terminals are connected to said first and second voice communication links via a switched network.

7. A method according to claim 6 wherein said switched network comprises a public switched telephone network.

8. A method according to claim 7 wherein said terminals comprise telephone terminals.

9. A method of voice communication between two terminals including the steps of:
   establishing a voice communication link between said terminals via a first packet network;
   communicating by voice between said terminals over said link;
   monitoring a parameter of said communication; and
   establishing a second voice communication link between said terminals via a second packet network when said monitored parameter departs from a predetermined value;
   wherein said terminals are connected to said first and second voice communication links via a switched network and
   wherein said second packet network comprises a control network for said switched network.

10. A method according to claim 6 wherein said second packet network comprises a common channel signaling system for said switched network.

11. A method according to claim 9 wherein said first packet network comprises a public packet data network.

12. A method according to claim 10 wherein said first packet network comprises the Internet.

13. A method according to claim 9 wherein switched network comprises a telephone network and said terminals comprise telephone terminals.

14. A method according to claim 13 wherein said telephone terminals are connected to signal switching points and said second packet network is connected between said signal switching points.

15. A method according to claim 14 wherein said telephone terminals are connected to local loops.

16. A method of voice communication between two terminals connected to a switched telephone network having a packet switched control network separate from said switched telephone network controlling operation of said switched telephone network, including the steps of:
   a) establishing a voice communication link between said terminals via a second packet network;
   b) communicating by voice between said terminals over said link;
   c) monitoring a parameter of said communication;
   d) establishing a second voice communication link between said terminals via said control network when said monitored parameter departs from a predetermined value.

17. A method according to claim 16 wherein said control network comprises a common channel signaling system controlling said switched telephone network.

18. A method according to claim 16 wherein said second packet network comprises an internetwork using a first protocol and said control network uses a second protocol for controlling said switched telephone network and for establishing said second voice communication link.

19. A method according to claim 16 wherein said parameter is a measure of the quality of delivered voice signal.

20. A method according to claim 16 wherein said voice communication link between said terminals is established by dial up connection to said switched telephone network.

21. A method according to claim 16 including the step of testing the load on said control network prior to establishing said second voice communication link between said terminals.

22. A method according to claim 16 including the step of recording the time duration of said voice communication link between said terminals via said control network.

23. A method according to claim 16 including the step of recording a count of cells used during a voice communication via said second voice communication link.

24. A method of voice communication between two terminals connected to signal switching points of a switched telephone network having a packet switched control network separate from said switched telephone network connected to said signal switching points and controlling operation of said switched telephone network, including the steps of:
   a) establishing a voice communication link between said terminals via a second packet network;
   b) communicating by voice between said terminals over said link;
   c) monitoring a parameter of said communication;
   d) establishing a second voice communication link between said terminals via said control network when said monitored parameter departs from a predetermined value.

25. A method according to claim 24 wherein said terminals comprise telephone terminals connected to said signal switching points via local loops.

26. A communication system comprising in combination a switched telephone network having spaced switching systems connected to terminals, a packet switched control network controlling said switched telephone network, and a second packet switched network connectable to said switching systems, wherein said terminals are connected to said second packet switched network and subsequently to said control network via said switching systems for voice communication between said terminals via said packet switched networks.

27. A communication system comprising in combination a switched telephone network having spaced switching systems connected to terminals, a packet switched control network controlling said switched telephone network, and a second packet switched network connectable to said switching systems, wherein said terminals are connected sequentially to said packet switched networks for voice communication between said terminals via said packet switched networks.

28. A system according to claim 27 wherein said terminals are connected to said second packet switched network and voice communication conducted via said second packet switched network and then connected to said packet switched control network and voice communication conducted via said packet switched control network.

29. A system according to claim 28 wherein connection to said packet switched control network is made responsive to decrease in the quality of voice communication via said second packet switched network.

30. A system according to claim 29 wherein said second packet switched network comprises the Internet.

31. A system according to claim 30 wherein said packet switched network comprises a common channel interoffice signaling network.

32. A system according to claim 31 wherein said terminals are connected for voice communication via a packet switched network responsive to establishing connection to a dialing terminal.

33. A communication system comprising in combination a switched telephone network having spaced switching systems connected to terminals, a packet switched control network controlling said switched telephone network, and a second packet switched network connectable to said switching systems, wherein said terminals are linked sequentially to said packet switched networks via said switching systems for voice communication between said terminals via packetized voice signals over at least one of said packet switched networks.

34. A system according to claim 33 including means for totalizing the units comprising said packetized voice signals over said at least one of said packet switched networks during said voice communication thereover.

35. A system according to claim 34 wherein said at least one packet switched network comprises said control network and said means for totalizing includes means monitoring said packetized voice signals and totalizing said units.

36. A system according to claim 35 including monitor control means for initiating said totalization for individual voice communications.

37. A system according to claim 36 including means for storing the results of said totalization.

38. A system according to claim 37 including means utilizing said results of said totalization for billing for said voice communication.

39. A communication system comprising in combination a switched telephone network having spaced switching systems connected to terminals, a packet switched control network controlling said switched telephone network, and a second packet switched network connectable to said switching systems, wherein said terminals are linked to at least one of said packet switched networks via said switching systems for voice communication between said terminals over said at least one of said packet switched networks via packetized voice signals, and means for totalizing the units comprising said packetized voice signals over said at least one of said packet switched networks during said voice communication thereover.

40. A system according to claim 39 wherein said at least one of said packet switched networks comprises said control network.

41. A system according to claim 40 wherein said means for totalizing includes means monitoring said packetized voice signals and totalizing said units.

42. A system according to claim 41 including monitor control means for initiating said totalization for individual voice communications.

43. A system according to claim 42 including means for storing the results of said totalization.

44. A system according to claim 43 including means utilizing said results of said totalization for billing for said voice communication.

\* \* \* \* \*